United States Patent [19]

Barclay

[11] Patent Number: 5,140,969

[45] Date of Patent: Aug. 25, 1992

[54] AUTOMATIC FUEL SAVER

[75] Inventor: Stanton D. Barclay, 150 Coolidge Ave., Watertown, Mass. 02172

[73] Assignee: Stanton D. Barclay, Watertown, Mass.

[21] Appl. No.: 837,116

[22] Filed: Feb. 19, 1992

[51] Int. Cl.$^5$ .............................................. F02M 73/04
[52] U.S. Cl. .................................... 123/585; 123/306
[58] Field of Search ............... 123/585, 590, 306, 308, 123/179.16

[56] References Cited

U.S. PATENT DOCUMENTS

| | | | |
|---|---|---|---|
| 3,854,463 | 12/1974 | Burden | 123/179.16 |
| 4,055,159 | 10/1977 | Cappiello | 123/585 |
| 4,235,209 | 11/1980 | Ibbott | 123/585 |
| 4,279,236 | 7/1981 | Dallman | 123/585 |
| 4,359,035 | 11/1982 | Johnson | 123/585 |
| 4,580,544 | 4/1986 | Walker | 123/306 |

Primary Examiner—E. Rollins Cross
Assistant Examiner—M. Macy

[57] ABSTRACT

An automatic fuel saver for a vehicle engine comprises a cyclonic turbulence chamber for connection between the engine intake manifold and the carburetor that supplies a fuel-air stream to the manifold. An air scoop is positioned at the front of the vehicle to collect supplemental air due to the forward motion of the vehicle. The supplemental air is conducted by a conduit to the turbulence chamber where it is introduced tangentially into the chamber and mixes cyclonically with the fuel-air stream being drawn into the engine from the carburetor, thereby providing supplemental oxygen to the engine in an amount which varies directly with the forward speed of the vehicle and the engine power demand.

2 Claims, 2 Drawing Sheets

AUTOMATIC FUEL SAVER

BACKGROUND OF THE INVENTION

This invention relates generally to internal combustion engines, and more particularly to a device for supplying supplemental air to the fuel-air mixture ingested by the engine from the carburetor in order to make the engine more fuel efficient.

In many gasoline engines, fuel is supplied to the intake manifold of the engine by way of a carburetor having a filtered air intake. During operation of the engine, air is drawn in through the carburetor over a layer of gasoline sitting in a bowl within the carburetor. The gasoline in the bowl is maintained at a certain level which is unrelated to engine displacement and power output. Even with optimum carburetion, some relatively large droplets or particles of gasoline or other fuel become mixed with the fuel vapor being drawn into the engine cylinders via the engine intake manifold. During the combustion process, these droplets do not burn completely. Therefore the fuel comprising those droplets does not contribute as much as it should to engine output power and it is expelled from the combustion chambers, appearing in the engine exhaust as unburned hydrocarbons or other atmospheric pollutants.

Various apparatus have been proposed heretofore to improve the fuel efficiency of internal combustion engines. However, these prior devices have tended to be rather complicated and to require active control by the vehicle operator.

For example, the device described in U.S. Pat. No. 4,055,159 has a filter funnel which takes in air and delivers it by way of a valve to the carburetor and the engine's PVC valve. Control means operatively associated with the valve and present inside the vehicle enable the vehicle operator to open and close the valve. U.S. Pat. No. 3,854,463 discloses a device for increasing engine efficiency which includes a funnel that conducts air from a vaporizing chamber which vaporizes fuel. Those fuel vapors are then conducted to the carburetor air intake. An electrically operated liquid level control maintains a supply of fuel in the vaporizing chamber. U.S. Pat. No. 4,279,236 discloses a fuel saving system which employs air scoops to conduct additional air to the carburetor air intake and to ventilate the engine crank case. Special aspirators are included in the system to separate gases with heavy particulates from gases containing lighter particulate matter. The heavier particulates are heated by heat from the exhaust manifold to form lighter particles which are then drawn back into the air flow by another aspirator and eventually routed to the intake filter of the carburetor. U.S. Pat. No. 4,235,209 discloses a device for pumping additional air by way of a multiple orifice unit The multiple orifice unit has a multiplicity of slot orifices to provide a sonic air flow condition at all engine speeds so that the air supply is maintained constant.

Aside from being relatively complex as noted above, these prior devices fail to mix the added air intimately enough with the fuel that powers the engine. As a result, engine operation is not as efficient as it might be so the engine is still deficient in terms of mileage per gallon of fuel consumed. Also, engines equipped with those devices still discharge relatively large amounts of pollutants into the atmosphere.

SUMMARY OF THE INVENTION

Accordingly, it is an object of the present invention to provide an automatic fuel saver for an internal combustion engine which provides supplemental oxygen to the combustion chambers of the engine resulting in additional engine power.

Another object of the invention is to provide such a device which reduces the amounts of unburned hydrocarbons, carbon monoxide and nitrogen oxides exhausted by the engine into the atmosphere.

A further object o the invention if to provide an automatic fuel saver for an internal combustion engine which has no moving parts.

Still another object of the invention is to provide a device of this type which can be retrofitted to existing internal combustion engines.

Yet another object of the invention is to provide an automatic fuel saver which provides different amounts of supplemental air to the engine combustion chambers depending upon the speed of the vehicle.

The invention accordingly comprises the features of construction, combination of elements are arrangement of parts which will be exemplified in the following detailed description, and the scope of the invention will be indicated in the claims.

Briefly, my automatic fuel saver incorporates an air scoop positioned at the front of the vehicle which collects supplemental air and delivers it to a turbulence chamber positioned in the fluid path between the carburetor and the engine intake manifold. The supplemental air is tintruced into the turbulence chamber tangentially so that it swirls cyclonically around the fuel-air mixture being drawn from the carburetor to the engine. Resultantly, the supplemental air further vaporizes the fuel component of that mixture and becomes intimately admixed therewith so that a homogeneous and more highly combustible mixture is drawn into the engine. Thus, when combustion does occur within the engine, it is quite complete so that a maximum amount of power is produced during each power stroke of the engine and minimum unburned hydrocarbons and nitrous oxides appear in the engine exhaust. The supplemental air gathered by the air scoop is directly related to the forward speed of the vehicle being driven by the engine. Thus my fuel saver proportions the amount of air drawn into the engine intake manifold quite accurately in order to propel the car most efficiently at the higher speed.

The fuel saver is quite simple, consisting merely of an air scoop, a turbulence chamber, and a conduit connecting those two elements. Therefore it is easy and inexpensive to manufacture as original equipment or as a kit which can be retrofit to existing internal combustion engines.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
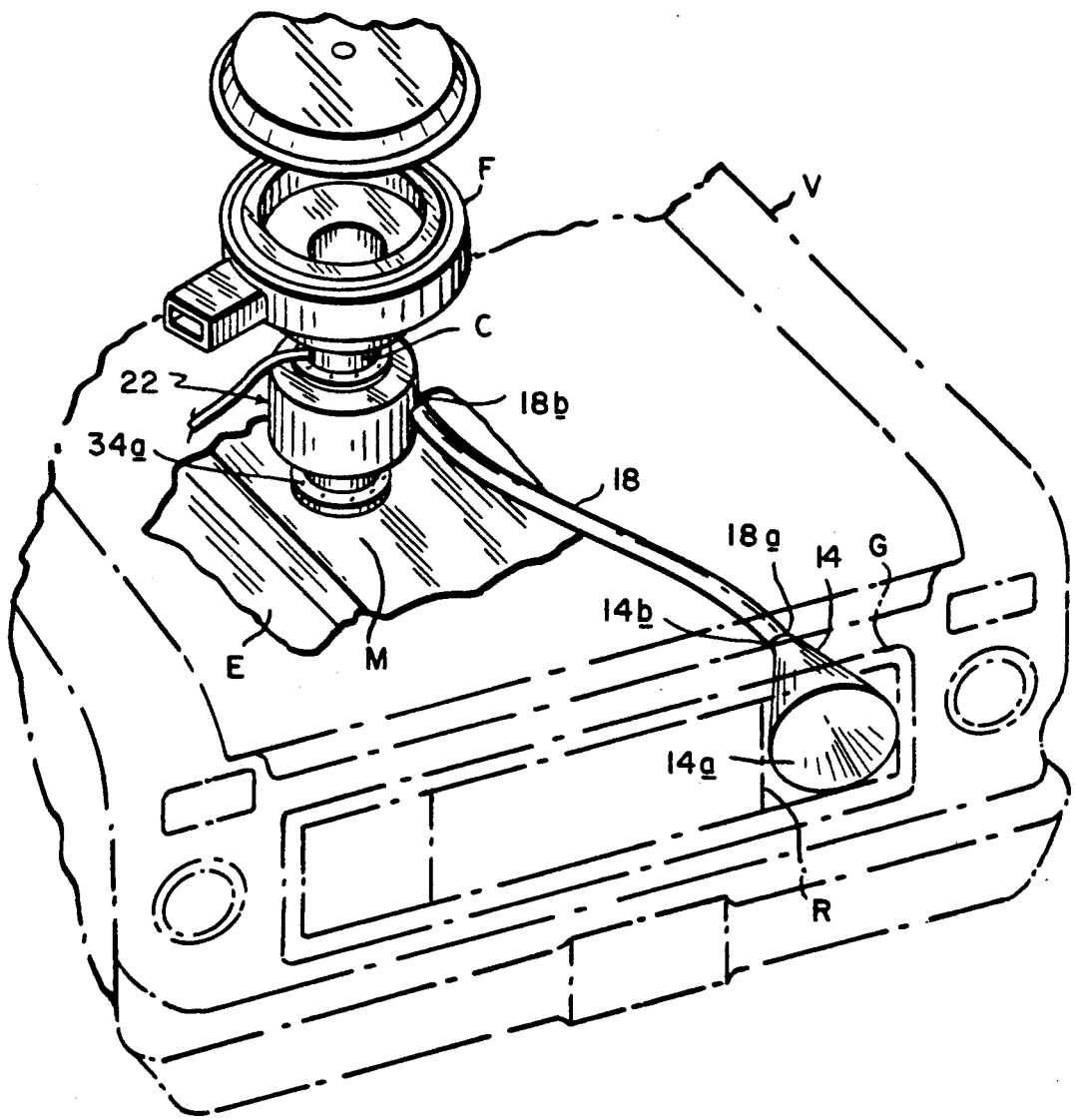
FIG. 1 is an exploded isometric view illustrating an internal combustion engine equipped with my automatic fuel saver.

In FIG. 1, my automatic fuel saver, indicated generally at 10, is shown installed on a gasoline engine E which powers a vehicle V having a front grill G covering a radiator R. My fuel saver comprises a funnel-shaped air scoop 14, mounted in the vehicle's engine compartment beside radiator R. The scoop 14 is oriented so that the relatively large mouth 14a of the scoop faces forwardly in position to collect air when the vehicle is in forward motion. The smaller end 14b of air scoop 14 is connected to the forward end 18a of a hose 18, which extends back to a turbulence chamber 22, connected between the outlet flange $C_1$ of carburetor C and the intake manifold M of engine E.

Figure 2:
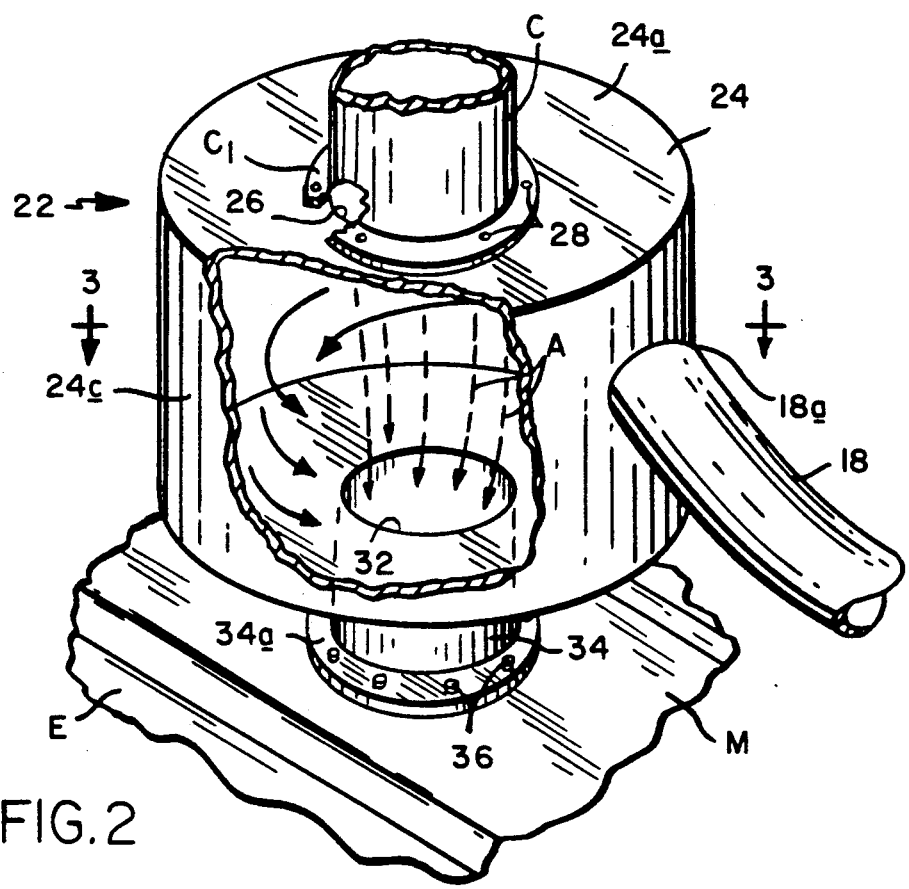
FIG. 2 is an isometric view on a larger scale and with parts broken away showing the turbulence chamber of my automatic fuel saver in greater detail.
Figure 3:
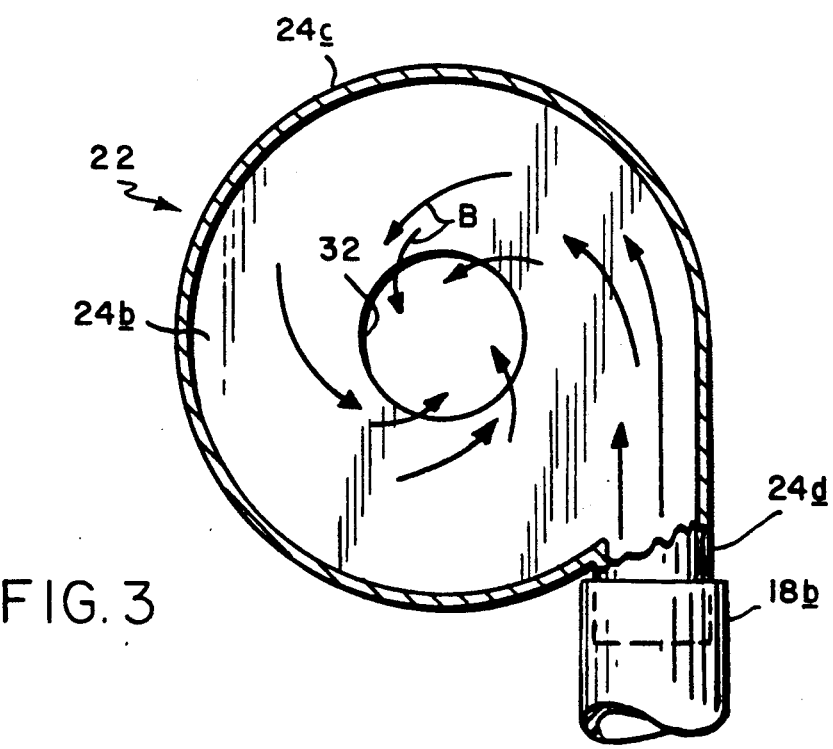
FIG. 3 is a sectional view taken along line 3—3 of FIG. 2.

Referring now FIGS. 2 and 3, the turbulence chamber 22 comprises a generally cylindrical metal housing 24 having a flat top wall 24a, a flat bottom wall 24b and a cylindrical side wall 24a. A circular opening 26 is formed in the center of the housing top wall 24a. Opening 26 is more or less the same size as the opening into the engine's intake manifold M. The carburetor flange $C_1$ is engaged around opening 26 and secured to the top of housing 24 by suitable threaded fasteners 28 as it would normally be secured to the engine intake manifold M.

An opening 32 is present in the housing bottom wall 24b which opens into the upper end of a stub tube 34 having a lower end which is flanged at 34a to seat on intake manifold M as the carburetor flange $C_1$ would normally seat on that manifold. The flanged end 34a of tube 34 is secured to the manifold by appropriate threaded fasteners 36.

As shown in FIGS. 2 and 3, the side wall 24c of housing 24 is provided with a tubular stem fitting 24d which leads tangentially into the interior of housing 24. The rear end 18b of hose 18 is engaged over that fitting so that the air captured by the scoop 14 depicted in FIG. 1 conducted by hose 18 to the interior of housing 24.

When the engine E is running, a standard fuel-air mixture from carburetor C is drawn more or less axially through housing 24 and enters the engine's intake manifold M by way of tube 34 as shown by the dashed arrows A in FIG. 2. As long as engine E is idling, the vehicle V is not moving forwardly and the engine is under no appreciable load. Therefore, that standard fuel-air mixture suffices to fuel the engine.

However, when the engine E is in gear and the vehicle V is moving forwardly, air is collected by the air scoop 14 and conducted via hose 18 to the turbulence chamber 22. As best seen in FIG. 3, due to the placement of stem fitting 24d, the air from hose 18 is introduced into the chamber housing 24 tangentially and swirls around the chamber cyclonically as indicated by the solid line arrows D in FIGS. 2 and 3. This supplemental air thus encircles the fuel-air stream from carburetor C, constricting and violently mixing with that mixture. This turbulence breaks up any residual fuel droplets or particles present in the fuel-air mixture and further vaporizes the fuel component, of that mixture as it is being drawn into the engine intake manifold M.

In addition, the supplemental air adds more oxygen to the mixture being fed to the engine thereby improving engine combustion and increasing engine power. This is accompanied by a marked reduction in unburned hydrocarbons, carbon monoxide and nitrous oxides exhausted from the engine E into the atmosphere.

It is also a feature of the invention that the amount of supplemental air introduced into the turbulence chamber 22 increases in proportion to the forward speed of the vehicle V. Consequently, the amount of supplemental air is automatically related directly to the fuel requirement and power demand needed to achieve the increased vehicle speed. In other words, as the vehicle moves faster, the air scoop 14 depicted in FIG. 1 captures more air and delivers that air at a higher velocity to turbulence chamber 22 thereby increasing the strength of the cyclonic swirling action occurring within that chamber. Resultantly, progressively more oxygen is added to the combustion process occurring within engine E, thereby maintaining engine efficiency and power output at the higher speeds.

Even though my fuel saver operates automatically, it still has no moving parts so that it is relatively easy and inexpensive to manufacture and to install. In fact, the fuel saver can be marketed in kit form so that it can be retrofit by a car owner to an existing vehicle.

It will thus be seen that the objects set forth above, among those made apparent from the preceding description, are efficiently attained and, since certain changes may be made in the construction set forth above without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. An automatic fuel saver for a vehicle engine which includes a carburetor and an intake manifold comprising
    a cyclonic turbulence chamber for placement in the fluid path between the carburetor and the manifold so that a fuel-air stream drawn into the manifold from the carburetor when the engine is in operation passes through the chamber said chamber comprising a generally cylindrical housing having flat top and bottom walls and a cylindrical side wall, coaxial inlet and outlet ports in said top and bottom walls for connection to the carburetor and manifold, respectively, and a tangential side port in the side wall;
    an air scoop for placement at the front of the vehicle in position to collect supplemental air due to forward motion of the vehicle, and
    conduit means for conducting the supplemental air to said side port so that when the vehicle is in forward motion, the supplemental air enters the chamber tangentially and mixes cyclonically with the fuel-air stream passing through the chamber.

2. The automatic fuel saver defined in claim 1 wherein the air scoop has a funnel shape so that it increases the velocity of the supplemental air conducted to the turbulence chamber.

* * * * *

UNITED STATES PATENT AND TRADEMARK OFFICE
CERTIFICATE OF CORRECTION

PATENT NO. : 5,140,969
DATED : August 25, 1992
INVENTOR(S) : Stanton D. Barclay

It is certified that error appears in the above-indentified patent and that said Letters Patent is hereby corrected as shown below:

Column 1, line 57, after "unit" add --into the combustion chambers of an internal combustion engine--.

Column 2, line 12, change "o" to --of.

Column 2, line 12, change "if" to --is--.

Column 2, line 23, change "are" to --and--.

Column 2, line 32, change "tintruced" to --introduced--.

Signed and Sealed this

Thirty-first Day of August, 1993

*Attest:*

BRUCE LEHMAN

*Attesting Officer*   Commissioner of Patents and Trademarks